(12) United States Patent
Ling et al.

(10) Patent No.: US 8,929,278 B2
(45) Date of Patent: Jan. 6, 2015

(54) METHOD AND APPARATUS FOR CONTENT PROTECTION AND BILLING FOR MOBILE DELIVERY OF SATELLITE CONTENT

(75) Inventors: Curtis Ling, Carlsbad, CA (US); Brenndon Lee, San Diego, CA (US); Prithvi Thomas, San Diego, CA (US)

(73) Assignee: MaxLinear, Inc., Carlsbad, CA (US)

( * ) Notice: Subject to any disclaimer, the term of this patent is extended or adjusted under 35 U.S.C. 154(b) by 130 days.

(21) Appl. No.: 13/585,930

(22) Filed: Aug. 15, 2012

(65) Prior Publication Data

US 2013/0201905 A1 Aug. 8, 2013

Related U.S. Application Data

(60) Provisional application No. 61/595,654, filed on Feb. 6, 2012.

(51) Int. Cl.
*H04B 7/185* (2006.01)
(52) U.S. Cl.
USPC .......................................................... 370/316
(58) Field of Classification Search
USPC .......... 370/316, 315, 389, 392, 401; 455/427, 455/430, 429, 450; 725/110, 86, 38, 132, 725/133
See application file for complete search history.

(56) References Cited

U.S. PATENT DOCUMENTS

| 8,561,114 | B2 * | 10/2013 | Jeffs ................................ 725/86 |
| 2002/0154055 | A1 | 10/2002 | Davis et al. |
| 2006/0262222 | A1 | 11/2006 | Monnier et al. |
| 2008/0060024 | A1 | 3/2008 | Decanne |
| 2009/0007189 | A1 | 1/2009 | Gutknecht et al. |
| 2009/0031367 | A1 | 1/2009 | Sue |
| 2009/0113492 | A1 | 4/2009 | Norin et al. |
| 2009/0288122 | A1 | 11/2009 | Zellner et al. |
| 2011/0107379 | A1 | 5/2011 | Lajoie et al. |

FOREIGN PATENT DOCUMENTS

| EP | 1494353 A3 | 1/2006 |
| WO | 2009143082 A1 | 11/2009 |
| WO | 2011033342 A1 | 3/2011 |

OTHER PUBLICATIONS

Int'l Search Report and Written Opinion for PCT/US2013/24961 dated Apr. 29, 2012.
European Search Report for EP 12003194 dated Aug. 24, 2012.

* cited by examiner

*Primary Examiner* — Chi H Pham
*Assistant Examiner* — Alexander O Boakye
(74) *Attorney, Agent, or Firm* — McAndrews, Held & Malloy, Ltd.

(57) ABSTRACT

A satellite dish assembly may comprise a reflector, feed horn, receive module, and wireless module. The reflector and feed horn may be operable to receive satellite signals. The receive module may be operable to recover content from the received satellite signals. The wireless module may be operable to communicate the content directly to a mobile device via a wireless connection between the mobile device and the system. The wireless module may be operable to communicate directly with a service provider network via a wireless connection between the satellite dish assembly and the service provider network. The communications with the service provider network may be to obtain security information for descrambling and/or decrypting the content and/or for providing billing information.

26 Claims, 9 Drawing Sheets

METHOD AND APPARATUS FOR CONTENT PROTECTION AND BILLING FOR MOBILE DELIVERY OF SATELLITE CONTENT

CLAIM OF PRIORITY

This patent application makes reference to, claims priority to and claims benefit from U.S. Provisional Patent Application Ser. No. 61/595,654 entitled "Method and System for an Internet Protocol LNB (IP LNB)" filed on Feb. 6, 2012.

The above-identified application is hereby incorporated herein by reference in its entirety.

INCORPORATION BY REFERENCE

This patent application also makes reference to:
U.S. patent application Ser. No. 13/546,704 entitled "Method and System for Multi-Service Reception" and filed on Jul. 11, 2012;
U.S. patent application Ser. No. 13/316,796 entitled "Method and System for Conditional Access in an In-Home Network Based on Multi-Network Communication," and filed on Dec. 12, 2011;
U.S. patent application Ser. No. 13/326,125 entitled "System and Method in a Broadband Receiver for Efficiently Receiving and Processing Signals" and filed on Dec. 14, 2011; and
U.S. patent application Ser. No. 11/928,203 entitled "Targeted Advertisement in the Digital Television Environment" and filed on Oct. 30, 2007.

Each of the above-identified applications is hereby incorporated herein by reference in its entirety.

TECHNICAL FIELD

Aspects of the present application relate to electronic communications. More specifically, to a method and apparatus for content protection and billing for mobile delivery of satellite content.

BACKGROUND

Existing methods and systems for delivering terrestrial and/or satellite broadcast content to mobile devices can be inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A method and/or apparatus is provided for content protection and billing for mobile delivery of satellite content, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "example" means serving as a non-limiting example, instance, or illustration. As utilized herein, the term "e.g.," introduces a list of one or more non-limiting examples, instances, or illustrations.

Figure 1A:
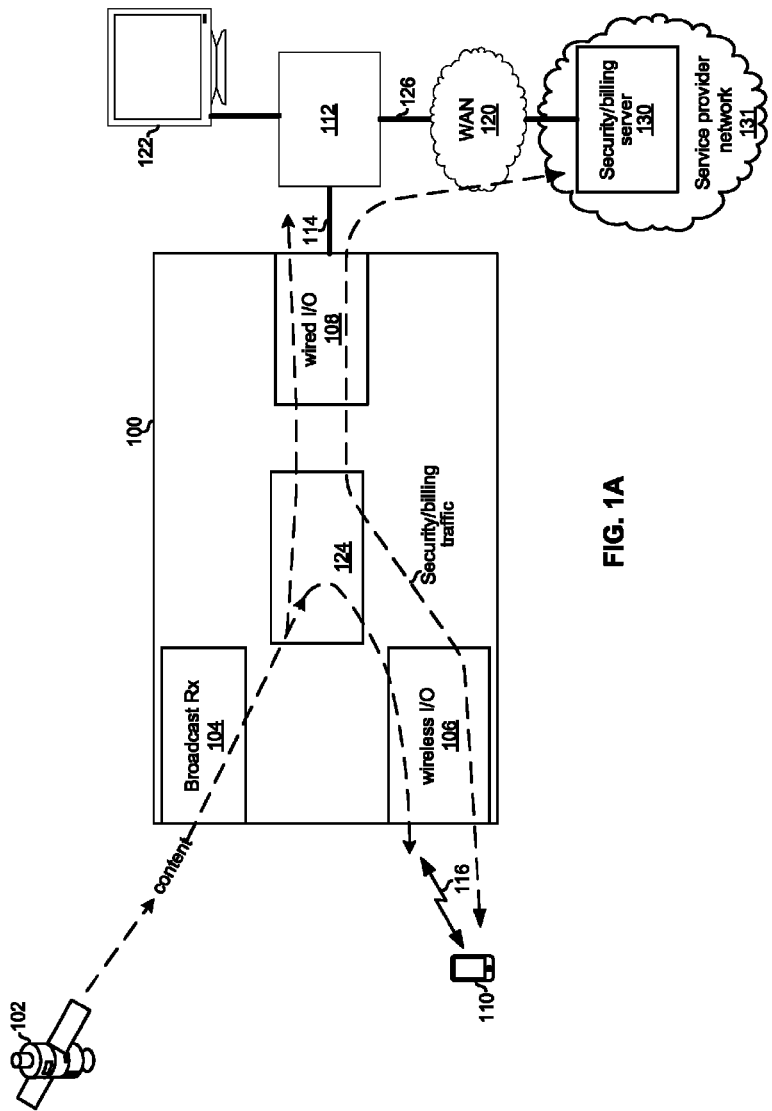
FIGS. 1A and 1B depict a system that is operable to wirelessly deliver satellite data to mobile devices.
Figure 1B:
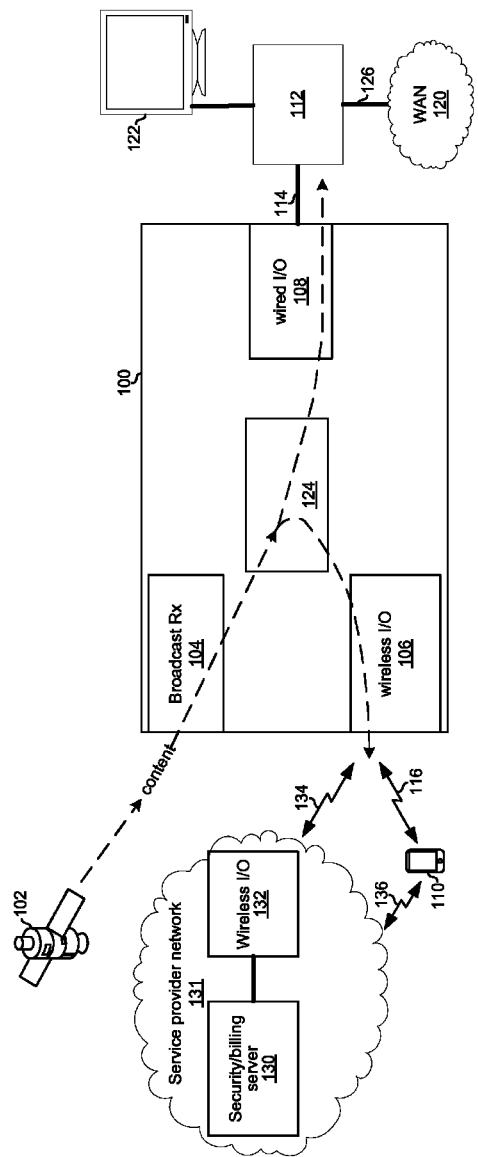

FIGS. 1A and 1B depict a system that is operable to wirelessly deliver satellite data to mobile devices. Referring to FIG. 1A, the system 100 comprises a broadcast receive module 104, a wireless input/output (I/O) module 106, a wired I/O module 108, and a routing module 124. Also shown is a service provider network 131, a mobile device 110, a module 112, a client device 122, and a wide area network (WAN) 120.

The satellite 102 may transmit content in accordance with a broadcast standard such as, for example, DVB-S. In an example implementation, some of the bandwidth of the satellite 102 may be utilized for transmitting mobile content. For example, the content of one or more television networks may be concurrently broadcast in a first format (e.g., high-definition, low-compression ratio video and surround-sound audio) a second format (e.g., standard definition, high-compression ration video and stereo audio). The first format may be encrypted and/or scrambled utilizing a first content protection scheme (e.g., a first set of security algorithms and/or a first set of keys and/or certificates) and the second format may be encrypted and/or scrambled utilizing a second content protection scheme (e.g., a first set of security algorithms and/or a first set of keys and/or certificates). For example, content protected with the first scheme may be recoverable only by devices (e.g., gateways) that have built-in hardware-based conditional access systems ("hardCAS"), whereas content protected with the second scheme may be recoverable utilizing keys obtained through two-way exchanges ("softCAS"). An example implementation in which mobile-formatted content is transmitted on one or more dedicated satellite channels using softCAS is described below with reference to FIG. 7A. An example implementation in which satellite content transmitted using hardCAS is transcoded for mobile delivery is described below with reference to FIG. 7B.

The network 131 represents the network(s) of one or more service providers. For example, the network 131 may comprise a network of a cellular service provider, a network of a satellite service provider, and/or a network of a billing service provider that performs billing functions for other service providers. The security and/or billing server 130 may manage billing accounts for subscribers of one or more service providers. For example, the server 130 may maintain a database of users and/or mobile devices which are subscribed to content transmitted by the satellite 102, and may track consumption of the satellite content by those users/devices. This information may be provided to a satellite service provider so that the satellite provider can bill the users/devices for the content. Similarly, the server 130 may maintain a database of users and/or mobile devices which are subscribed to wireless (e.g., cellular) services associated with the wireless module 106 and may track usage of the module 106's bandwidth. This information may be provided to a cellular service provider so that the cellular provider can bill the user/devices for the bandwidth usage.

Additionally or alternatively, the security and/or billing server 130 may manage certificates, keys, and/or other security information for accessing content transmitted by the satellite 102. For example, the server 130 may maintain a database of content currently being transmitted by the satellite 102 and keys and/or other security information associated with that content. In the example implementation shown in FIG. 1A, the system 100 communicates with the server 130 via the WAN 120. In the implementation shown in FIG. 1B, on the other hand, the server 130 is reachable wirelessly, via wireless I/O module 132, such that the system 100 can communicate with the server 130 via a connection 134 without use of the WAN 120 or broadband connection 126.

The mobile device 110 may be operable to communicate wirelessly in accordance with one or more wireless communication protocols. For example, the device 110 may be a cellular handset operable to communicate in accordance with cellular (e.g., LTE) and/or IEEE 802.11 protocols.

Figure 2:
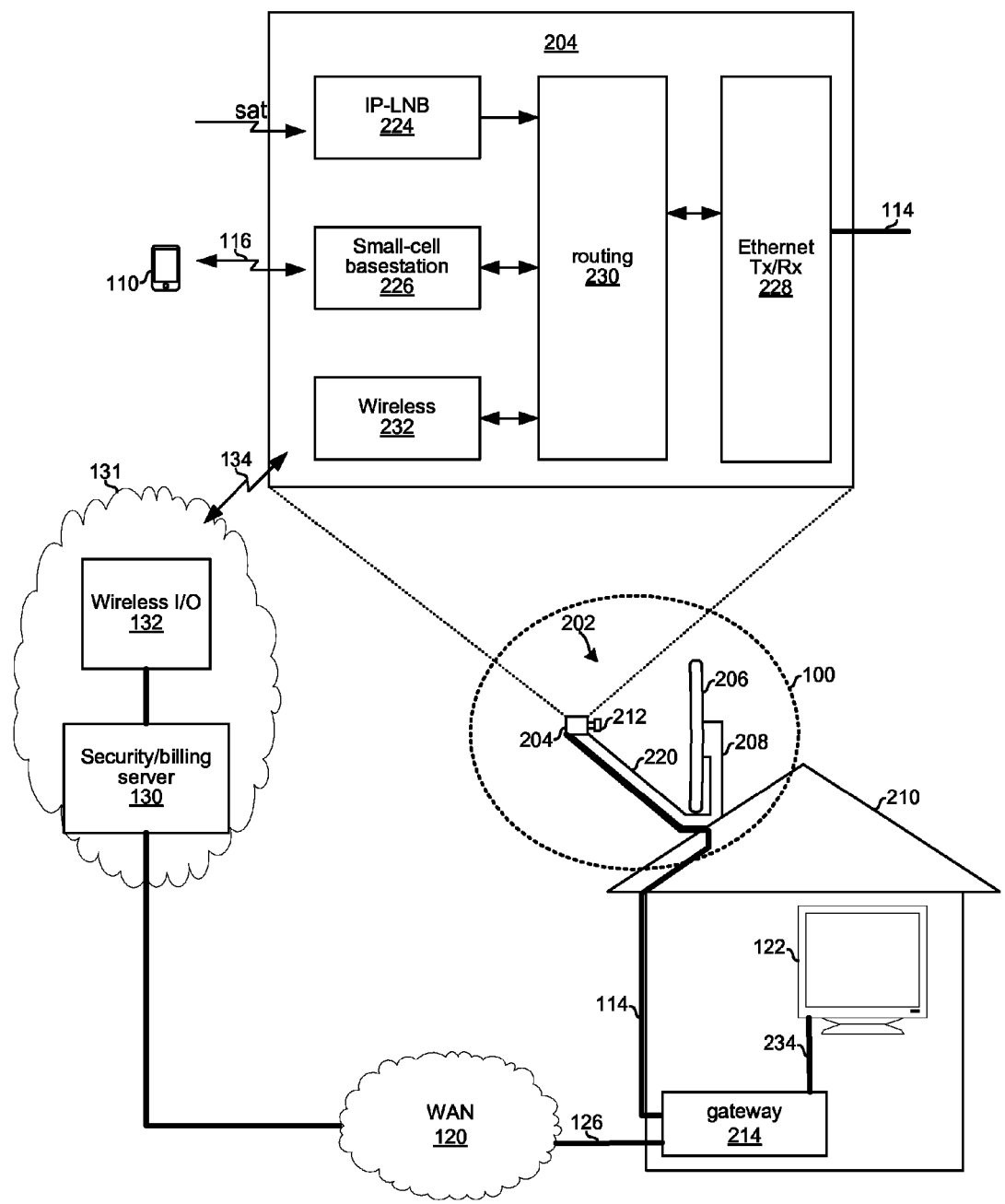
FIG. 2 depicts an example implementation of the system of FIG. 1 in which the system comprises a small-cell basestation.
Figure 3:
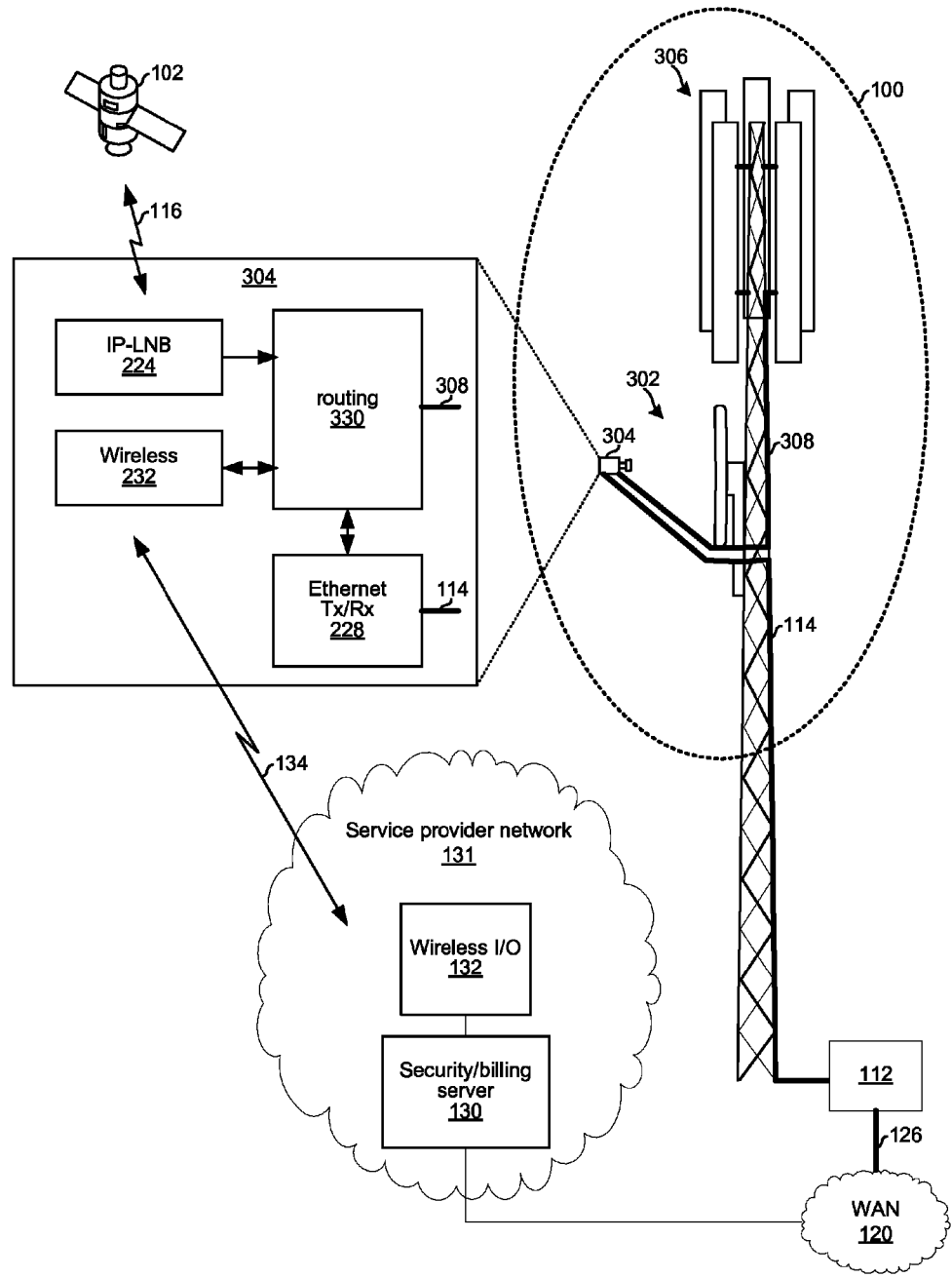
FIG. 3 depicts an example implementation of the system of FIG. 1 in which the system comprises a macrocell basestation.

The various components of the system 100 and the module 112 may be collocated on, for example, a cellular tower as shown in FIG. 3 or a satellite subscriber premises (e.g., a house, multi-dwelling unit, or business) as shown in FIG. 2. The system 100 may comprise one or more printed circuit boards and/or on one or more integrated circuits (e.g., one or more silicon die).

The system 100 and the module 112 may be part of a local area network (LAN) and may be interconnected via a LAN technology such as Ethernet (e.g., Ethernet frames communicated over an Ethernet physical layer such as 10/100/1 G/10 G/40 GBASE-T). In an example implementation, each port of the system 100 and the port of module 112 that connects to system 100 may share a common subnet address that is not shared with the port of the module 112 that connects to the WAN 120. The module 112 may interface the LAN to a wide area network (WAN) 120 over broadband connection 126 utilizing, for example, DOCSIS, DSL, Carrier Ethernet, ATM, Frame Relay, ISDN, x.25, and/or other suitable WAN technology. The WAN 120 may, for example, backhaul traffic between wireless I/O module 106 and a cellular core network.

The broadcast (e.g., satellite broadcast) receive module 104 may be operable to receive broadcast signals and process the received broadcast signals to recover data (e.g., audio, video content, and/or auxiliary data related to audio and/or video content) carried therein. Although this disclosure focuses on satellite radio and satellite television broadcast signals, the present invention is not so limited. Rather, other types of signals such as terrestrial broadcast television signals are contemplated. Accordingly, various implementations of the system 100 may comprise features described in U.S. patent application Ser. No. 13/546,704, which is incorporated herein by reference as set forth above. In an example implementation, the receive module 104 may perform channelization such that specific channels, streams, programs, etc. from the receive module 104 can be selectively conveyed to the routing module 124. In an example implementation, the receive module 104 may output data in the form of MPEG transport stream(s) to the routing module 124. In an example implementation, the receive module 104 may encapsulate received data utilizing one or more protocols (e.g., Internet Protocol) for output to the routing module 124.

The wireless module 106 may be operable to communicate wirelessly in accordance with one or more wireless communication protocols. For example, the wireless module 106 may be operable to communicate in accordance with cellular (e.g., LTE) and/or IEEE 802.11 protocols. In various example implementations, the wireless module 106 may transmit and/or receive utilizing frequency spectrum owned and/or licensed by a cellular provider, utilizing unlicensed frequency spectrum (e.g., in an Industrial, Scientific, and Medical (ISM) band) and/or utilizing dedicated frequency spectrum owned and/or licensed by the satellite provider affiliated with the satellite 102. In an example implementation, data may be communicated between the wireless module 106 and the routing module 124 in the form of MPEG transport stream (TS) packets. In an example implementation, data may be communicated between the wireless module 106 and the routing module 124 in the form of Internet Protocol (IP) packets.

The wired module 108 may be operable to communicate data, via one or more cables 114, with module 112. The module 112 (e.g., a media gateway and/or edge router) may, in turn, route traffic between the system 100 and one or more other devices (e.g., client devices connected to the gateway and/or interior network nodes connected to the gateway). In an example implementation, the wired I/O module 108 may be operable to output, onto the cable(s) 114, L-band signals received from the receive module 104. Such signals may be output in instances that the module 112 is a legacy gateway. Additionally or alternatively, the wired module 108 may be operable to communicate over the cable(s) 114 utilizing Ethernet, Multimedia over Coax Alliance (MoCA), and/or any other suitable protocol(s). Such communications may be used, for example, when the module 112 is a gateway that is compatible with an IP-LNB as described in U.S. patent application Ser. No. 13/326,125, which is incorporated by reference herein as set forth above.

In another example implementation, the module 112 may support a wireless connection and the functionality of the wired module 108 may be subsumed by the wireless module 106 and/or by a second wireless module.

The routing module 124 may be operable to selectively route data and/or signals between the modules 104, 106, and 108. The routing may be based, for example, on IP addresses, TCP/UDP port numbers, packet identifiers (PIDs), stream identifiers, and/or any other suitable field or information. For example, packets comprising a first PID (e.g., packets carrying mobile-formatted content) may be sent to the wireless module 106 and packets comprising a second PID (e.g., packets carrying high-definition content) may be sent to the wired module 108. In an example implementation, the routing module 124 may be a digital and/or analog crossbar. In an example implementation, the routing module 124 may perform an OSI layer-3 packet-routing function and/or an OSI layer-2 packet-switching function. The routing module 124 may be configured via one or more control signals (not shown) which may, in turn, be based on input (e.g., utilizing a protocol such as DiSEqC) from the module 112 and/or client devices such as the client device 122 and client device 110.

In operation of an example implementation, the broadcast receive module 104 may receive a satellite signal and perform block down conversion to generate an L-band signal. The L-band signal may be conveyed to the wired module 108 for support of legacy gateways. The receive module 104 may also demodulate the L-band signal to recover one or more MPEG transport streams, channelize the transport stream(s) to recover one or more programs, and encapsulate the transport stream(s) and/or program(s) into one or more packet streams (e.g., utilizing IP or some other suitable protocol(s)). In some instances, the receive module 104 may be operable to decrypt, encrypt, descramble, and/or scramble recovered transport stream(s)/program(s) as described in U.S. patent application Ser. No. 13/316,796, which is incorporated by reference herein as set forth above. The one or more packet streams may be conveyed, via routing module 124, to the wireless module 106 and/or the wired module 108.

The wired module 108 may decapsulate, encode, modulate, encrypt, and/or otherwise process the transport stream(s) to generate signals suitable for transmission via the cable(s) 114. The wired module 108 may transmit the generated signals via the cable(s) 114.

The wireless module 106 may encode, modulate, and/or otherwise process the packet stream(s) received from the routing module 124 to generate signals suitable for transmission via the connection(s) 116. The wireless module 106 may then transmit the generated signals via the connection(s) 116. Thus, the system 100 may enable delivering satellite data to the mobile device 110 without the data having to traverse the WAN 120 or the broadband connection 126. The wireless module 106 may also convey information about the mobile device 110, and information about the satellite content consumed by the mobile device 110, to the server 130 for purposes of billing and/or usage tracking.

In an example implementation, content received via receive module 104 and transmitted via wireless module 106 may remain encrypted and/or scrambled from the satellite 102 to the mobile device 110. The mobile device 110 may decrypt and/or descramble the content using security keys and/or other information received from the server 130. The mobile device 110 may get the key(s) and/or other information from the server 130 via a connection to the system 100 that is out-of-band with the connection 116. Additionally or alternatively, the system 100 may relay the keys from the server 130 to the mobile device 110 via the connection 116. Additionally or alternatively, the mobile device 110 may get the key(s) and/or other information directly from the service provider network 131 via a connection 136.

In another example implementation, content from the satellite 102 to the receive module 104 may be encrypted and/or scrambled using a first one or more algorithms and/or keys, and content from the system 100 to the mobile device 110 may be encrypted and/or scrambled using a second one or more algorithms and/or keys. The receive module 104 may descramble and/or decrypt the content using (e.g., using information obtained from the server 130 and/or contained in secure hardware of the system 100). The system 100 may then encrypt and/or scramble the content using a second one or more algorithms and/or keys prior to transmitting the content to the mobile device 110. The mobile device 110 may decrypt and/or descramble the content using keys received from the server 130. The mobile device 110 may get the key(s) and/or other information from the server 130 via a connection that is out-of-band with the connection 116. Additionally or alternatively, the system 100 may relay the keys from the server 130 to the mobile device 110 via the connection 116.

FIG. 2 depicts an example implementation of the system of FIG. 1 in which the system comprises a basestation, such as, for example, a small-cell (e.g., femtocell or picocell) base station. In FIG. 2, the system 100 comprises a satellite dish assembly 202, and a gateway 214. The subassembly 204 comprises a feed horn 212, an IP-LNB module 224, a cellular basestation module 226, a routing module 230, an Ethernet transceiver module 228, and a wireless transceiver 232. The various modules of the subassembly 204 may reside in one or more housings, on one or more printed circuit boards, and/or one or more integrated circuits (e.g., one or more silicon dice).

In the example implementation depicted, the satellite dish assembly 202 comprises a parabolic reflector 206 and a subassembly 204 mounted (e.g., bolted or welded) to a support structure 208 which, in turn, comprises a boom 220 and attaches (e.g., via bolts) to the premises 210 (e.g., to the roof). In another example implementation, all or a portion of the modules 224, 226, 228, 230, and 232 may be mounted to the premises separate from the satellite dish (e.g., connected via wired and/or wireless connections), but may still be part of the "outdoor unit." In another example implementation, all or a portion of the modules 224, 226, 228, 230, and 232 may be part of the gateway 214 (or "indoor unit").

The IP-LNB module 224 may be an implementation of the receive module 104 described above and may be as described in U.S. patent application Ser. No. 13/326,125, which is incorporated herein by reference, as set forth above. The nomenclature "IP-LNB" indicates that the module 224 possesses capabilities beyond the block downconversion of received satellite signals that is performed by conventional LNBs. Functions performed by the IP-LNB module 224 may comprise, for example, downconverting received satellite signals, demodulating received satellite signals, channelizing received satellite signals, and/or encapsulating data recovered from received satellite signals into IP packets.

The routing module 230 may be an implementation of the routing module 124 described above. Functions performed by the routing module 230 may comprise routing of data between the IP-LNB module 224, the cellular basestation module 226, and the Ethernet transceiver module 228. Although an implementation in which the routing module supports IP-based routing is described herein, any suitable protocols (e.g., Ethernet, PCIe, USB, etc.) can be utilized for communication of data between modules 224, 226, 228, 230, and 232.

The Ethernet transceiver module 228 may be an implementation of the wired module 108 described above. Functions performed by the module 228 may comprise encapsulation of data from the routing module 230 into Ethernet frames and transmission of the Ethernet frames onto the cable(s) 114 in accordance with Ethernet protocols. Additionally or alternatively, functions performed by the module 228 may comprise reception of Ethernet frames via the cable(s) 114, processing of the Ethernet frames to recover data carried therein (e.g., IP packets), and conveyance of the recovered data to the routing module 230.

The combination of the small-cell basestation module 226 and the wireless module 232 may be an implementation of the wireless module 106 described above. Functions performed by the basestation module 226 may comprise communication with cellular-enabled user-equipment (e.g., handsets, tablets, and/or laptops) that are within communication range of the basestation 226. The basestation module 226 may be operable to receive data via one or more cellular connections 116, process the received data, and output the data to the routing module 230 in the form of one or more IP packets. Similarly, the small-cell basestation 226 may be operable to receive IP packets from the routing module 230, process the IP packets, and transmit signals carrying the IP packets (or their contents) via one or more connections 116.

Functions performed by the wireless module 232 may comprise accessing the security and/or billing server 130 via the wireless connection 134 between the wireless module 106 of the system 100 and the wireless module 132 which provides wireless connectivity to the server 130. The amount of bandwidth needed for communicating billing and/or security information over the connection 134 may be small relative to the amount of bandwidth needed for communicating content over the connection(s) 116. Accordingly, in an example implementation, the module 226 may utilize, for example, $4^{th}$ generation protocols such as LTE whereas the wireless module 232 may utilize, for example, 2.5 or $3^{rd}$ generation protocols such as EDGE, HSPA, or EVDO.

The gateway 214 may be an implementation of module 112 described above. Functions performed by the gateway 214 may comprise reception, processing, and transmission of data. The gateway 214 may transmit and/or receive data to and/or from the system 100 (via cable(s) 114), the WAN 120 (via WAN connection 126), and/or one or more client devices 122 (via one or more connections 234). For data from the module 228 to a client device 122, the gateway 214 may recover the data from Ethernet frames received over the cable(s) 114 and output the data to the client device 122. For data from the client device 122 and/or gateway 114 to the module 228, the gateway 214 may encapsulate the data in one or more Ethernet frames and output the frames onto the cable(s) 114. For data between the WAN 120 and the module 228, the gateway 214 may perform OSI layer-2 switching and/or OSI layer-3 routing. Although the implementation shown in FIG. 2 uses wired connections between the gateway 214 and module 228, and between the gateway 214 and WAN 120, other may utilize wireless connections. Although the gateway 214 is depicted as separate from the system 100, in other implementations at least a portion of the system 100 may reside in and/or be implemented by the gateway 214.

In operation, the mobile device 110 within the coverage area of the basestation module 226 may connect to the basestation module 226 and request satellite content. In response to the request for content, the system 100 may communicate with the server 130 to verify that the mobile device 110 is authorized to receive the requested content, and to provide information to the server 130 so that that an account associated with the mobile device 110 can be billed for the requested content and/or for the bandwidth utilized in receiving the content. The system 100 may communicate with the server 130 via the wireless module 232, the connection 134, and the wireless module 132. Additionally or alternatively, the system 100 may communicate with the server 130 via the module 228, cable 114, gateway 214, and WAN 120.

Upon receiving an indication from the server 130 that the mobile device 110 is authorized to receive the content that it is requesting, the module 224 may tune to the portion of the satellite spectrum carrying the requested content, and process the received satellite signal to output the requested content to the routing module 230 which may convey it to the module 226. The content may be output, for example, in the form of an MPEG transport stream encapsulated in an IP packet stream. The basestation module 226 may then further process the IP packet stream as necessary and transmit it to the device 110.

In this manner, content may be delivered to the mobile device 110 without the content having to traverse the WAN 120 or the connection 126. Thus, in instances that the system 100 communicates with the server 130 via connection 126 and WAN 120, content may be delivered to the mobile device 110 while only adding a small amount of billing and/or security traffic to the WAN 120. Moreover, in instances that the system 100 communicates with the server 130 via connection 134, media content may be delivered to mobile device 110 without putting any load on the connection 126 or WAN 120, thus enabling delivery of the content even when the broadband connection 126 and/or WAN 120 are unavailable. Scrambling, descrambling, encrypting, and/or decrypting of the content for delivery to the mobile device 110 may be as described below with respect to one or both of FIGS. 4 and 5.

In an exemplary embodiment, the mobile device 110 may belong to a first satellite subscriber and the satellite dish assembly 302 may be installed at the home of a second satellite subscriber. Thus, aspects of the present disclosure may enable the first subscriber to receive satellite content to which he has subscribed via another subscriber's satellite dish assembly.

FIG. 3 depicts an example implementation of the system of FIG. 1 in which the system comprises a basestation such as, for example, a macrocell basestation. In FIG. 3, the system 100 includes a basestation 306 and a satellite dish assembly 302 that, in turn, comprises a subassembly 304. In the example implementation shown in FIG. 3, the combination of the wireless module 232 and the basestation 306 may be an implementation of the wireless module 106 described above. Similarly, the routing module 330 may be an implementation of the routing module 124 described above, the wireless transceiver 232 may be as described above, the module 228 may be as described above, and the module 112 may be as described above. The routing module 330 may be operable to selectively route data and/or signals between the modules 224, 232, 228, and the basestation 306.

In operation, the mobile device 110 within the coverage area of the basestation 306 may connect to the basestation 306 and request content that is broadcast by the satellite 102. The basestation 306 may send the request to the subassembly 304, which may then communicate with a billing and/or security server (via connection 134 and/or via WAN 120) to enable verification that the mobile device 110 is authorized to receive the requested content, and to provide information to the server 130 so that that an account associated with the mobile device 110 can be billed for the requested content.

Upon receiving an indication from the server 130 that the mobile device 110 is authorized to receive the content that it is requesting, the module 224 may tune to the portion of the satellite spectrum carrying the requested content, and process the received satellite signal to output the requested content to the routing module 230 which may convey it to the basestation 306. The content may be output, for example, in the form of an MPEG transport stream encapsulated in an IP packet stream. The basestation 306 may then further process the IP packet stream as necessary and transmit it to the mobile device 110.

In this manner, content may be delivered to the mobile device 110 without the content having to traverse the WAN 120 or the connection 126. Thus, in instances that the system 100 communicates with the server 130 via connection 126 and WAN 120, content may be delivered to the mobile device 110 while only adding a small amount of billing and/or security traffic to the WAN 120. Moreover, in instances that the system 100 communicates with the server 130 via connection 134, media content may be delivered to mobile device 110 without putting any load on the connection 126 or WAN 120, thus enabling deliver of the content even when the broadband connection 26 and/or WAN 120 are unavailable. Scrambling, descrambling, encrypting, and/or decrypting of the content for delivery to the mobile device 110 may be as described below with respect to one or both of FIGS. 4 and 5.

Figure 4:
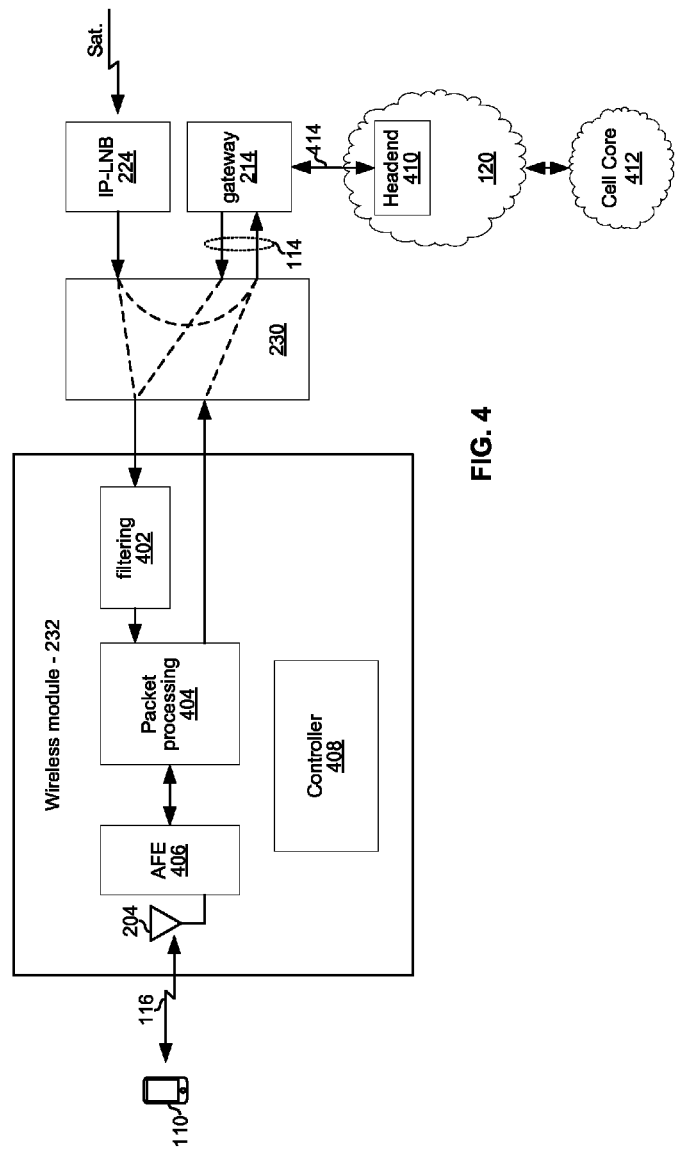
FIG. 4 depicts another example implementation of the system of FIG. 1.

FIG. 4 depicts another example implementation of the system of FIG. 1. Shown in FIG. 4 are the routing module 240, the IP-LNB module 224, and the gateway 214 described above. Also shown are: a headend 410 and cellular core network 412 which are part of the WAN 120; and example components of the wireless module 232 which may be, for example, a macrocell or small-cell basestation, and which includes an analog front end (AFE) 406, packet processing module 404, port filtering module 402, and controller 408.

The controller 408 may be operable to control operation of the wireless module 232. This may comprise, for example, executing an operating system and generating signals which may control operation of various modules of the wireless module 232.

The packet processing module 404 may be operable to encapsulate, decapsulate, encode, decode, and/or otherwise process packets in accordance with communication protocols being used for communicating with the routing module 240 and in accordance with communication protocols being used for communicating via the connection(s) 116. In this manner, data received from the routing module 240 may be made suitable for communication via the connection(s) 116 and data received via the connection(s) 116 may be made suitable for communication to the routing module 240.

The AFE 204 may perform upconversion, modulation, amplification, digital-to-analog conversion, and/or any other suitable processing functions for receiving digital data from the packet processing module 404 and generating RF signals to communicate the data wirelessly. Similarly, the AFE 204 may perform downconversion, demodulation, amplification, analog-to-digital conversion, and/or any other suitable processing functions for recovering data from received RF signals and conveying the data to the packet processing module 404.

The traffic filtering module 402 may be operable to inspect traffic input to the wireless module 232 from the routing module 240 to determine whether the traffic is approved for communication via the cellular connection(s) 116. The filtering module 402 may, for example, comprise a table of authorized IP addresses, TCP/UDP ports, and/or some other identifiers for determining which traffic is authorized. In an example implementation, an identifier of the IP-LNB module 224 may be programmed into the filtering module 402 after authenticating the IP-LNB module 224. Thereafter, the filtering module 402 may accept traffic from the IP-LNB module 224 as well as traffic from the cellular core network 412 (received via the headend 410 and gateway 214). Traffic not identified as coming from either of these sources may be dropped.

The traffic filtering module 402 may also be operable to keep track of traffic traversing the wireless module 232. This information may be provided to the server 130 for billing accounts for consumed satellite content and/or for billing cellular accounts for use of the basestations 226's bandwidth.

The headend 410 may be operable to provide the gateway 214 with access to the WAN 120 (and thus the cellular core network 412). In an implementation, the headend 410 may be operable to detect and log traffic communicated over the WAN connection 414. For example, the headend 410 may keep track of the amount of traffic identified as being associated with the IP-LNB module 224, the basestation 226, and/or the cellular core network 412. Such information may be, for example, provided to the server 130 for billing cellular customers, cellular providers, satellite customers, and/or satellite providers for use of the connection 414.

Figure 5:
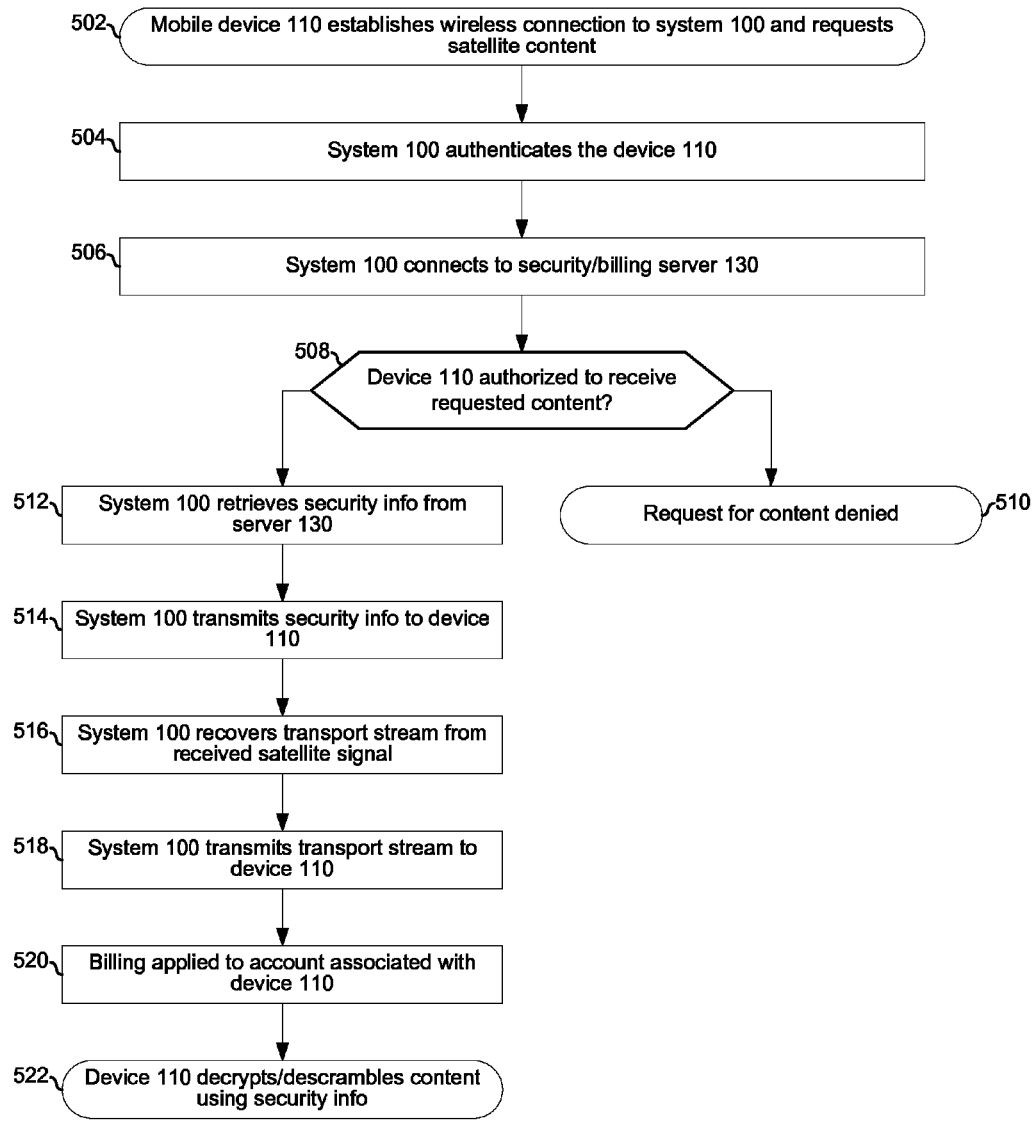
FIG. 5 is a flowchart illustrating example steps for billing and content security in a system that delivers satellite content to mobile devices.

FIG. 5 is a flowchart illustrating example steps for billing and content protection in a system that delivers satellite content to mobile devices. The steps begin with step 502 in which the mobile device 110 wirelessly connects to system 100 and requests content which is broadcast by the satellite 102. In step 504, the system 100 authenticates the device 100. Authentication may comprise, for example, the mobile device 110 providing billing information such as a password, a certificate, a unique identifier, an account number, etc. and the system 100 relaying this information to the server 130. In step 506, the system 100 connects to the server 130 (e.g., via WAN 120 and/or wireless connection 134 that bypasses the WAN 120) and provides info about the mobile device 110 and/or the requested content to the server 130. In step 508, the system 100 communicates with the server 130 to determine whether the mobile device 110 is authorized to receive the requested content. If not, then in step 510, the request for content is denied.

Returning to step 508, if the mobile device 110 is authorized to receive the requested content, then the steps proceed to step 512. In step 512, the system 100 retrieves security info from the server 130. In this regard, the satellite 102 may transmit the requested content in the form of a scrambled and/or encrypted transport stream. The security info retrieved in step 512 may comprise keys and/or certificates for decrypting and/or descrambling the transport stream.

In step 514, the system 100 securely transmits the security info retrieved in step 512 to the mobile device 110. In step 516, the system 100 processes received satellite signals to recover the scrambled and/or encrypted transport stream carrying the requested content. In step 518, the system 100 transmits the transport stream to the mobile device 110. In step 520, an account associated with the mobile device 110 is updated to reflect the delivery of the requested content to the device 110. In step 522, the mobile device 110 uses the security info received in step 514 to decrypt and/or descramble the transport stream, such that the mobile device 110 can then further process the transport stream and present the content (e.g., via a display and/or speakers).

Figure 6:
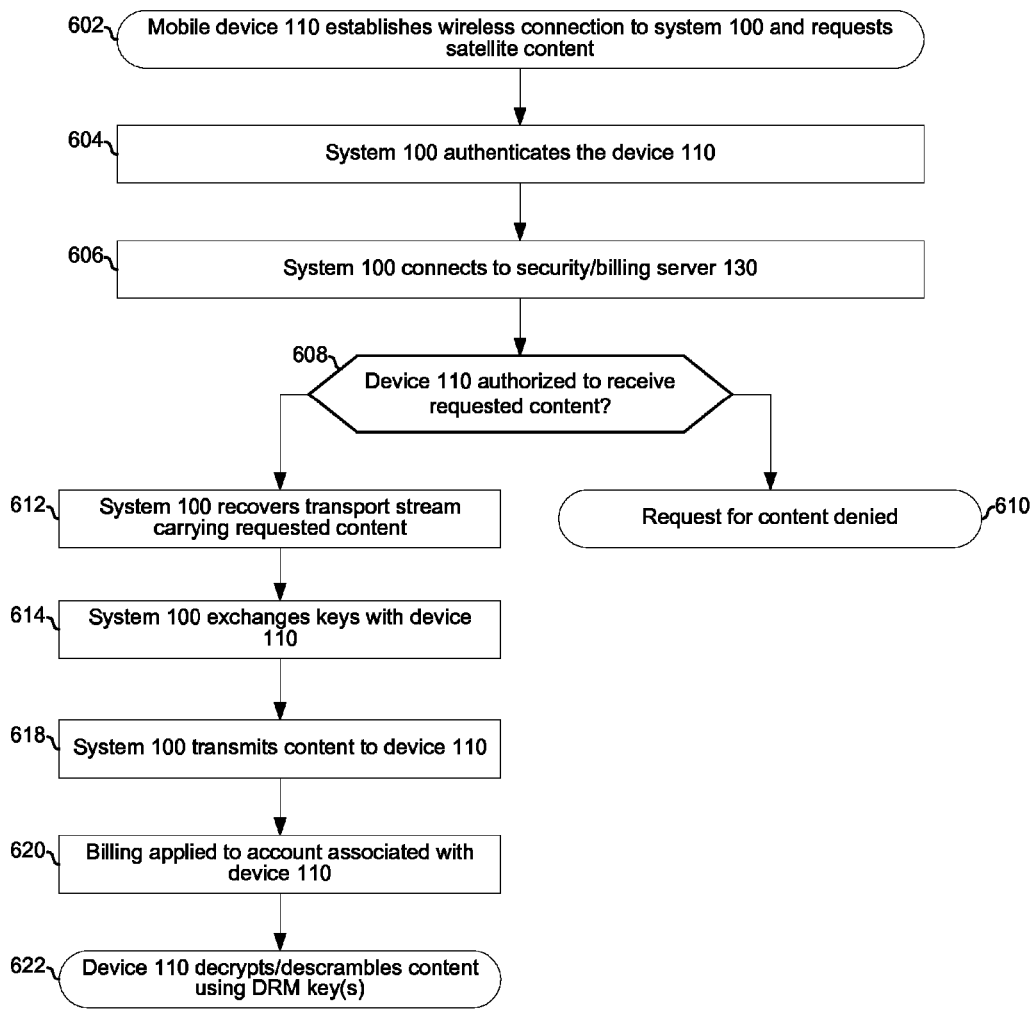
FIG. 6 is a flowchart illustrating example steps for billing and content security in a system that delivers satellite content to mobile devices.

FIG. 6 is a flowchart illustrating example steps for billing and content security in a system that delivers satellite content to mobile devices. The steps begin with step 602 in which the mobile device 110 wirelessly connects to system 100 and requests content which is broadcast by the satellite 102. In step 604, the system 100 authenticates the device 100. Authentication may comprise, for example, the mobile device 110 providing billing information such as a password, a certificate, a unique identifier, an account number, etc., and the server 130 determining (e.g., using information received via system 100) that the device 110 is associated with a cellular and/or satellite account such that it is authorized to receive content via the module 232. In step 606, the system 100 connects to the server 130 (e.g., via WAN 120 and/or wireless connection 134 that bypasses the WAN 120) and provides info about the mobile device 110 and/or the requested content to the server 130. In step 608 the system 100 communicates with the server 130 to determine whether the mobile device 110 is authorized to receive the requested content. If not, then in step 610, the request for content is denied.

Returning to step 608, if the mobile device 110 is authorized to receive the requested content, then the steps proceed to step 612. In step 612, the system 100 processes received satellite signals to recover the transport stream(s) carrying the requested content. The processing may include decrypting and/or descrambling the transport stream(s). In an exemplary implementation, such decrypting and/or descrambling may be performed via a hardware-based conditional access subsystem in the system 100.

In step 614, the system may perform a key exchange with the mobile device 110. In step 618, the system 100 transmits the encrypted and/or scrambled transport stream to the device 110. In step 620, an account associated with the mobile device 110 is updated to reflect the delivery of the requested content to the mobile device 110. In step 622, the mobile device 110 decrypts and/or descrambles the transport stream using keys determined in step 614.

Figure 7A:
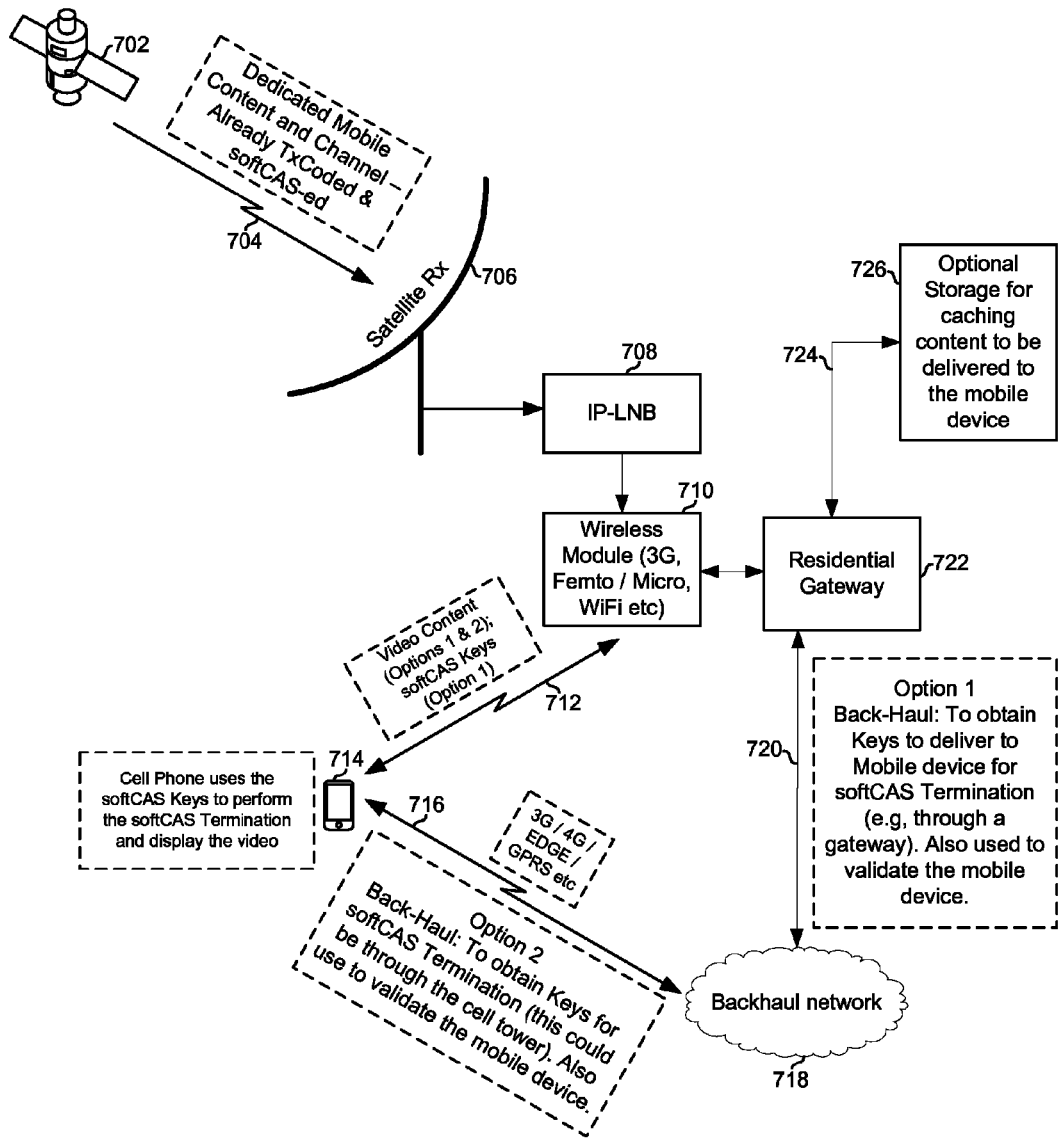
FIG. 7A depicts an example implementation in which mobile-formatted content is transmitted on one or more dedicated satellite channels using softCAS.

FIG. 7A depicts an example implementation in which mobile-formatted content is transmitted on one or more dedicated satellite channels using softCAS. Referring to FIG. 7A, there is a shown satellite 702 transmitting a signal 704, a satellite dish 706, an IP-LNB 708, a wireless module 710, wireless connection 712, a mobile device 714, a wireless connection 716, backhaul network 718, residential gateway 722, and a cache 726 connected to the gateway via connection 724.

The satellite dish 706 may comprise, for example, a parabolic reflector and feed horn. The IP-LNB 708 may be an implementation of the module 104 described above and may be similar to the ILNB 224 described above. The wireless module 710 may be an implementation of the module 106 described above and may be similar to the modules 226, 232, and/or 306 described above. The mobile device 714 may be similar to the device 110 described above. The backhaul network 718 may be similar to the WAN 120 described above. The residential gateway 722 may be an implementation of the module 112 described above and may be similar to the gateway 214 described above. The residential gateway 722 may typically, but not necessarily, reside inside the satellite customers premises (e.g., home or office).

The cache 726 may comprise, for example, a digital video recorder, file server, and/or other computing device operable to store and playback media content. In an example implementation, regular and/or mobile formatted content received from the satellite 702 and/or from the backhaul network 718 may be stored in the cache 726. In response to a request for cached content from the mobile device 714, the gateway 722 may be read content out of the cache 726 and convey content to the wireless module 710 which may, in turn, transmit the content to the mobile device 714.

In operation, the satellite dish 706 may receive the signal 704 from the satellite 702 and convey the signal to the IP-LNB 708 for processing. The signal 704 may comprise one or more channels that are dedicated for carrying mobile-formatted content. For example, a selected one or more television networks or programs may be transcoded and encrypted using softCAS techniques prior to being transmitted by the satellite 702. In an example implementation, because the mobile-formatted content may have a lower bitrate than the conventionally formatted content, multiple streams of mobile-formatted content (e.g., multiple television networks or programs) may be multiplexed onto a single satellite channel which would conventionally carry only a single stream of content (e.g., a single television network or program).

A stream of mobile-formatted content may be output by the IP-LNB module 708 to the wireless module 710. The wireless module 710 may, in turn, transmit the content to the mobile device 714 via the connection 712. The mobile device may utilize softCAS keys to decrypt the content and display it to its user.

In one example implementation ("option 1"), the mobile device 714 may get the softCAS keys from the wireless module 710 which, in turn, gets them from the backhaul network via the gateway 722. In such an implementation, validation of the mobile device 714 (i.e., determining that the mobile device 714 is permitted to access the mobile-formatted content), may be performed via the wireless module 710 and gateway 722.

In another example implementation ("option 2"), the mobile device 714 may get the softCAS keys, and be validated, via a cellular connection to the network 718 that does not include the wireless module 710 and/or the gateway 722.

Figure 7B:
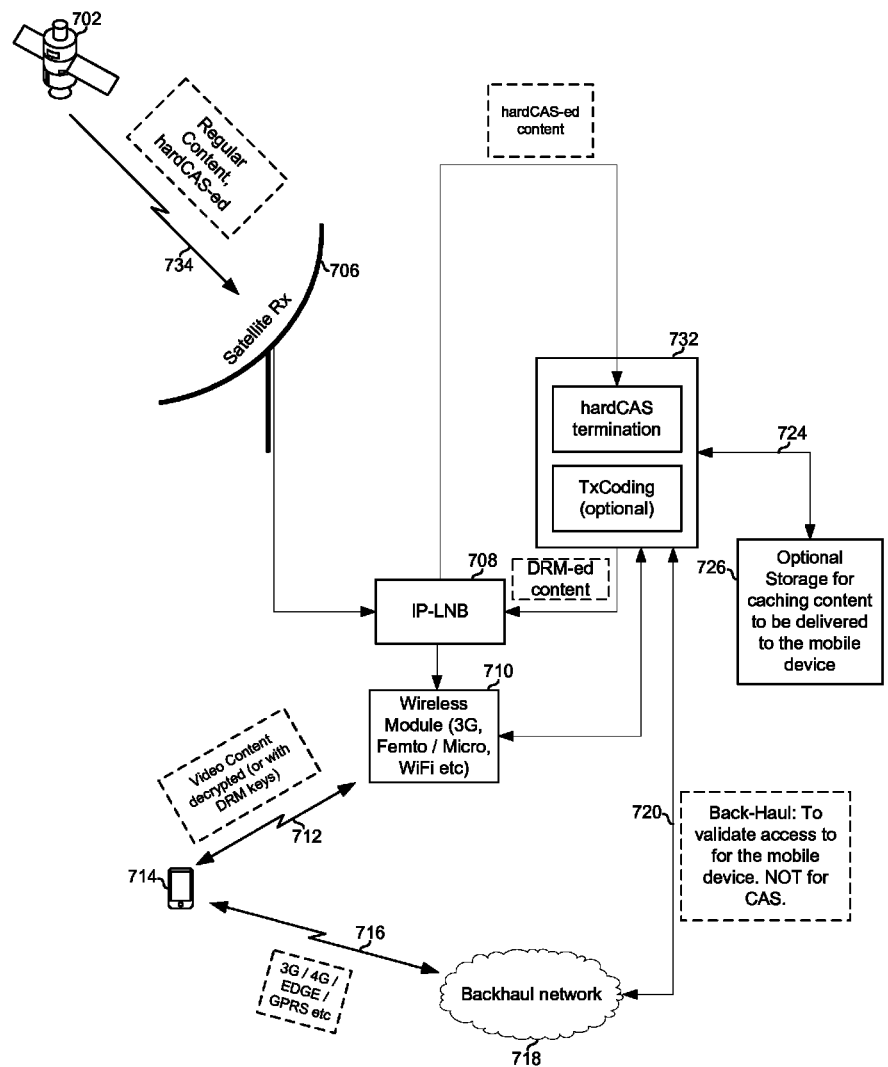
FIG. 7B depicts an example implementation in which satellite content transmitted using hardCAS is transcoded for mobile delivery by the system of FIG. 1.

FIG. 7B depicts an example implementation in which satellite content transmitted using hardCAS is transcoded for mobile delivery by the system of FIG. 1. Each of the satellite 702, the satellite dish 706, the IP-LNB 708, the wireless module 710, the mobile device 714, the network 718, and the cache 726 may be as described above with reference to FIG. 7A.

The gateway 732 may be similar to the gateway 722 described with reference to FIG. 7A but may additionally perform functions of terminating hardCAS and/or transcoding of received content to generate a mobile-formatted version of the content.

In operation, a signal 734 carrying content protected with a hardCAS system may be received via the dish 706 and conveyed to the IP-LNB 708. The IP-LNB may, in turn, forward the content to the gateway 732 where the hardCAS may be terminated. Optionally, after terminating the hardCAS, the gateway 732 may transcode the content to generate mobile-formatted content. Also optionally, the content may be re-encrypted and/or otherwise protected using key and/or certificate based digital rights management (DRM) protection. The content, which may be transcoded and/or DRM protected, may then be conveyed to the wireless module 710 which may, in turn, transmit the content to the mobile device 714 via connection 712. If the content is DRM protected, the keys may be communicated to the device via connection 712 after validating the device. The validation of the device 714 may be via the gateway 732 and wireless module 710. The connection 716 may be utilized for conventional cellular communications with the mobile device 714. In an example implementation, the connections 712 and 716 may coexist such that the mobile device 714 can, for example, receive media content via the connection 712 while concurrently communicating with a cellular basestation that is not the module 710.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for content protection and billing for mobile delivery of satellite content.

Accordingly, the present method and/or apparatus may be realized in hardware, software, or a combination of hardware and software. The present method and/or apparatus may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or apparatus may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A system comprising:
circuitry for use in a satellite dish assembly, the circuitry comprising a receiver,
a first transceiver, and a second transceiver, wherein:
said receiver is operable to receive a satellite signal and process said satellite signal to recover media content carried in said satellite signal;
said first transceiver is operable to receive, from a wireless communication device, a request for said media content;
said second transceiver is operable to communicate with a service provider network to determine whether said wireless communication device is authorized to receive said media content; and
said first transceiver is operable to communicate said media content to said wireless communication device via a first wireless connection;
said satellite dish assembly is connected to a gateway that routes traffic between said satellite dish assembly and a wide area network connection terminated at said gateway; and
communications between said circuitry and said service provider network do not traverse said network connection terminated at said gateway.

2. The system of claim 1, wherein said circuitry is operable to communicate with said service provider network via a second wireless connection.

3. The system of claim 2, wherein said circuitry supports higher bandwidth than said second wireless connection.

4. A system comprising:
circuitry for use in a satellite dish assembly, the circuitry comprising a receiver,
a first transceiver, and a second transceiver, wherein:
said receiver is operable to receive a satellite signal and process said satellite signal to recover media content carried in said satellite signal;
said first transceiver is operable to receive, from a wireless communication device, a request for said media content;
said second transceiver is operable to communicate with a service provider network to determine whether said wireless communication device is authorized to receive said media content; and
said first transceiver is operable to communicate said media content to said wireless communication device via a first wireless connection;
said satellite dish assembly is connected to a gateway that routes traffic between said satellite dish assembly and a wide area network connection terminated at said gateway; and
said media content does not traverse said network connection terminated at said gateway in traveling from said circuitry to said wireless communication device.

5. The circuitry of claim 4, wherein said circuitry is operable to communicate with said service provider network via a second wireless connection.

6. The circuitry of claim 5, wherein said circuitry supports higher bandwidth than said second wireless connection.

7. A system comprising:
circuitry for use in a satellite dish assembly, the circuitry comprising a receiver,
a first transceiver, and a second transceiver, wherein:
said receiver is operable to receive a satellite signal and process said satellite signal to recover media content carried in said satellite signal;
said first transceiver is operable to receive, from a wireless communication device, a request for said media content;
said second transceiver is operable to communicate with a service provider network to determine whether said wireless communication device is authorized to receive said media content; and
said first transceiver is operable to communicate said media content to said wireless communication device via a first wireless connection; and
said second transceiver is operable to communicate with said service provider network to provide information about said wireless communication device, information about content requested by said wireless communication device, and/or information about content consumed by said wireless communication device.

8. The system of claim 7, wherein said service provider network utilizes said information about said wireless communication device, said information about content requested by said wireless communication device, and/or said information about content consumed by said wireless communication device for managing a billing account associated with said wireless communication device.

9. The circuitry of claim 7, wherein said circuitry is operable to communicate with said service provider network via a second wireless connection.

10. The circuitry of claim 9, wherein said circuitry supports higher bandwidth than said second wireless connection.

11. A system comprising:
circuitry for use in a satellite dish assembly, the circuitry comprising a receiver,
a first transceiver, and a second transceiver, wherein:
said receiver is operable to receive a satellite signal and process said satellite signal to recover media content carried in said satellite signal;
said first transceiver is operable to receive, from a wireless communication device, a request for said media content;

said second transceiver is operable to communicate with a service provider network to determine whether said wireless communication device is authorized to receive said media content; and said first transceiver is operable to communicate said media content to said wireless communication device via a first wireless connection;

said second transceiver is operable to receive, from said service provider network, security keys associated with said media content; and said first transceiver is operable to communicate said security keys to said wireless communication device.

12. The circuitry of claim 11, wherein said circuitry is operable to communicate with said service provider network via a second wireless connection.

13. The circuitry of claim 12, wherein said circuitry supports higher bandwidth than said second wireless connection.

14. A method performed by a satellite dish assembly, the method comprising:

receiving a satellite signal and processing said satellite signal to recover media content carried in said satellite signal;

receiving, from a wireless communication device, a request for said media content;

communicating with a service provider network to determine whether said wireless communication device is authorized to receive said media content; and communicating said media content to said wireless communication device via a first wireless connection, wherein:

said satellite dish assembly is connected to a gateway that routes traffic between said satellite dish assembly and a wide area network connection terminated at said gateway; and communications between said satellite dish assembly and said service provider network do not traverse said network connection terminated at said gateway.

15. The method of claim 14, wherein said communicating with said service provider network is via a second wireless connection.

16. The method of claim 15, wherein said first wireless connection supports higher bandwidth than said second wireless connection.

17. A method performed by a satellite dish assembly, the method comprising:

receiving a satellite signal and processing said satellite signal to recover media content carried in said satellite signal;

receiving, from a wireless communication device, a request for said media content;

communicating with a service provider network to determine whether said wireless communication device is authorized to receive said media content; and communicating said media content to said wireless communication device via a first wireless connection, wherein:

said satellite dish assembly is connected to a gateway that routes traffic between said satellite dish assembly and a wide area network connection terminated at said gateway; and said media content does not traverse said network connection terminated at said gateway in traveling from said satellite dish assembly to said wireless communication device.

18. The method of claim 17, wherein said communicating with said service provider network is via a second wireless connection.

19. The method of claim 18, wherein said first wireless connection supports higher bandwidth than said second wireless connection.

20. A method performed by a satellite dish assembly, the method comprising:

receiving a satellite signal and processing said satellite signal to recover media content carried in said satellite signal;

receiving, from a wireless communication device, a request for said media content;

communicating with a service provider network to determine whether said wireless communication device is authorized to receive said media content;

communicating said media content to said wireless communication device via a first wireless connection; and communicating with said service provider network to provide said service provider network with information about said wireless communication device, information about content requested by said wireless communication device, and/or information about content consumed by said wireless communication device.

21. The method of claim 20, wherein said service provider network utilizes said information about said wireless communication device, said information about content requested by said wireless communication device, and/or said information about content consumed by said wireless communication device for managing a billing account associated with said wireless communication device.

22. The method of claim 20, wherein said communicating with said service provider network is via a second wireless connection.

23. The method of claim 22, wherein said first wireless connection supports higher bandwidth than said second wireless connection.

24. A method performed by a satellite dish assembly, the method comprising:

receiving a satellite signal and processing said satellite signal to recover media content carried in said satellite signal;

receiving, from a wireless communication device, a request for said media content;

communicating with a service provider network to determine whether said wireless communication device is authorized to receive said media content; and communicating said media content to said wireless communication device via a first wireless connection;

receiving, from said service provider network, security keys associated with said media content; and communicating said security keys to said wireless communication device.

25. The method of claim 24, wherein said communicating with said service provider network is via a second wireless connection.

26. The method of claim 25, wherein said first wireless connection supports higher bandwidth than said second wireless connection.

* * * * *